Norton & Hancock,
Pug Mill.
No. 76,505. Patented Apr. 7, 1868.

Witnesses:
Geo. H. Miller
Thos. H. Dodge

Inventors:
R. B. Norton
F. Hancock

United States Patent Office.

F. B. NORTON AND F. HANCOCK, OF WORCESTER, MASSACHUSETTS.

Letters Patent No. 76,505, dated April 7, 1868.

---

COMBINED CLAY-GRINDING AND SEPARATING MILL.

---

The Schedule referred to in these Letters Patent and making part of the same.

---

KNOW ALL MEN BY THESE PRESENTS:

That we, F. B. NORTON and F. HANCOCK, both of the city and county of Worcester, and Commonwealth of Massachusetts, have invented certain new and useful Improvements in Combined Clay-Grinding and Separating Mills for potters' use; and we do hereby declare that the following is a full, clear, and exact description of the same, reference being had to the accompanying drawings, forming a part of this specification, and in which—

Figure 1:
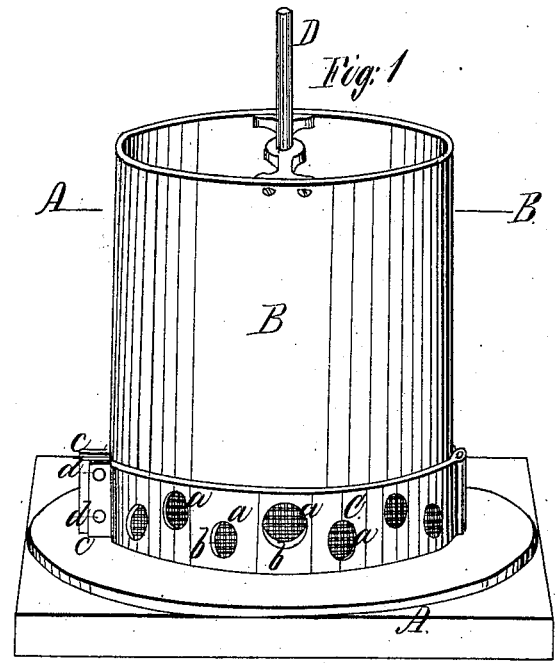
Figure 2:
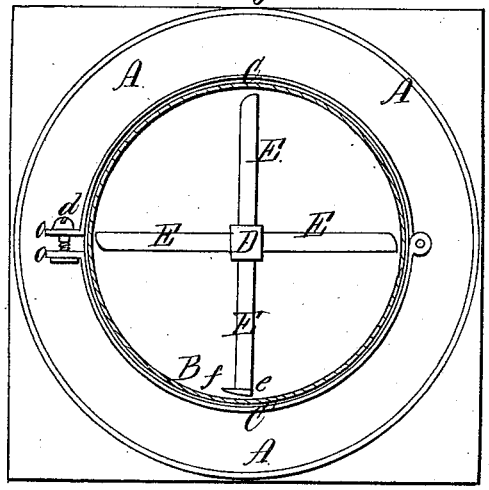

Figure 1 represent a perspective view of our combined clay-grinding and separating mill, and Figure 2 represents a cross-section on line A B.

To enable those skilled in the art to which our invention belongs to make and use the same, we will proceed to describe it more in detail.

In preparing clay for potters' use, as heretofore practised, it has been the practice to grind and mix it in a mill prepared solely for such purpose, and then remove the clay and work it through a sieve or screen by a separate operation. The result of this mode of preparing potters' clay for use is, that the clay is not properly screened from its impurities, while at the same time it involves a slow and tedious operation. As is well understood by all potters, there is a large per cent. of the wares made by the old mode rendered almost worthless in the process of baking, in consequence of scaling, and which is occasioned solely by the impurities contained in the clay, or which become mixed with it in transportation.

We have been largely engaged in the manufacture of pottery of various styles, and, from the great losses which we have sustained from time to time, have been led to seek some more perfect mode of preparing the clay, and have devised the simple yet effectual combined clay-grinding and separating mill shown in the drawings.

The part marked A is the base, upon which the cylinder B rests. The lower part of cylinder B is perforated with a series of holes, $a\ a$, made in this instance upon irregular lines, as fully indicated in the drawings. The holes $a\ a$ are covered with a strip of wire cloth, $b$, which is held in place by the hinged curved clasps or guards C C, having ears $c\ c$, through which screws or bolts $d\ d$ pass to hold the clasps or guides C C firm up against the wire cloth. Within the cylinder B is stepped the shaft D, having arms E, by which the clay is ground and worked properly, while, with one or both of the ends of the bottom arm, is combined a pressing-lip, $e$, the edge $f$ of which is made sharp and inclined in, so that as it is moved forward it separates a portion of the clay, which is forced out through the sieve or wire cloth $b$ by the inclined rear part 1 of the lip, while the fine pebbles, pieces of coal and rock, and other similar impurities or foreign substances, are stopped by the sieve.

After the mill has been in use some time, the sieve or wire cloth $b$ can be easily removed by unfastening the clasps C C, and turning them back, when the impurities lodged against the sieve, in the holes of the cylinder, can be readily removed.

Power may be communicated to the shaft D in any well-known manner.

We have a mill in practical operation, and therefore know from practical experience the real value and utility of our said invention. It saves in time, so far as the grinding and separating of the clay are concerned, while, in addition thereto, we find that our previous loss from scaling, as before stated, is now reduced to a very small per cent.

Having described our potters' combined clay-grinding and separating mill, what we claim therein as new and of our invention, and desire to secure by Letters Patent, is—

1. The combination, with a perforated potters' clay-grinding cylinder, of a separating-sieve and sieve-holder, substantially as and for the purposes set forth.

2. The combination, with the perforated clay-grinding cylinder B, separating-sieve $b$, and sieve-holder C, of the rotary grinding-arms E, provided with one or more lips, $e$, substantially as and for the purposes set forth.

F. B. NORTON,
F. HANCOCK.

Witnesses:
GEO. H. MILLER,
THOS. H. DODGE.